Patented Jan. 5, 1926.

1,568,162

UNITED STATES PATENT OFFICE.

GEORGE F. HUMPHREY, OF BRIDGETOWN, NOVA SCOTIA, CANADA, ASSIGNOR TO APPO-KRISP LIMITED, OF KENTVILLE, NOVA SCOTIA, CANADA.

FRUIT AND CEREAL PRODUCT AND METHOD OF PRODUCING SAME.

No Drawing.  Application filed February 4, 1924. Serial No. 690,668.

*To all whom it may concern:*

Be it known that I, GEORGE F. HUMPHREY, a subject of the King of Great Britain, and resident of Bridgetown, in the Province of Nova Scotia and Dominion of Canada, have invented certain new and useful Improvements in Fruit and Cereal Products and Methods of Producing Same, of which the following is a full, clear, and exact description.

This invention relates to a prepared fruit and cereal food, and the method of producing same, the object of the invention being to combine a fruit with a cereal in such proportions as to form a balanced ration which will be easily digested and assimilated.

A further object of the invention is to provide a method of introducing into a breakfast food a natural fruit, which when prepared and cooked and incorporated with the starch and proteids of the cereal element will readily ferment under the action of ordinary yeast, notwithstanding that an excess of fruit acid is present at this stage. The presence of these acids not only imparts a distinct fruity flavor to the finished product, but also aids in toughening the gluten in the flour, enabling fermentation to proceed for a longer period, checking the action of enzymes which usually soften the gluten and partly digest it. Hitherto, various breakfast foods have been made from such grains as wheat, rice, barley and maize, which are usually subjected to the action of heat for a brief period, which does not always sufficiently cook the starched grains. This is especially true of maize. The subsequent toasting stage is accomplished when most of the moisture has been expelled by surface evaporation, so that the final action of heat on the starch, when in a comparatively dry condition, does not appreciably increase its solubility. According to my invention, by first mixing the ingredients and adding yeast, fermentation proceeds and enzymic action follows within the mass for a comparatively brief period. The material is then baked at a low temperature for from one and a half to two hours, thereby ensuring a thorough cooking of the starch, proteids and the fruit.

A specific example of carrying out the invention according to my process may be given as follows:—Where it is found desirable to use a raw fruit, such as apples, I take say two hundred pounds of apples, which are cleaned and then placed in open pans and cooked in an oven or retort without the addition of water. In about an hour or when they are sufficiently cooked, they are pressed through a fine mesh strainer to remove the skins, seeds and seed cells. The resultant pulp is then evaporated or dried until it is reduced to about one hundred pounds' weight. Sugar is then added to the pulp and the amount of sugar necessary will of course be in proportion to the acidity of the pulp, which will vary considerably according to the kind of apples used. From ten to twenty pounds of sugar is usually sufficient. I also add from ten to sixteen ounces of salt to the pulp and the temperature is reduced to approximately 100° F. One pound of yeast is then dissolved in about one pint of warm water, and this yeast is afterwards added to the mass. The pulp is placed in a mixing and kneading machine and the yeast is added gradually along with approximately one hundred pounds of cereal flour, such as wheat flour, the flour being added while the machine is in action. The mixing and kneading operation is continued for about fifteen minutes until a uniform and a tenacious dough is produced. The temperature at the end of the kneading period should not exceed eighty degrees Fahrenheit, as higher temperatures tend to weaken the gluten, preventing the formation of large vesicles, which are necessary to ensure the penetrative action of heat throughout the dough. This mixture resembles ordinary dough, excepting that it is drier and firmer. It is not intended, however, to be fermented to that stage employed when making ordinary bread. In my process, fermentation is only continued for from fifty to sixty minutes, or just sufficient to allow the enzymes to act for a brief period on the starch and to prevent the formation of alcohol, which would reduce the food value of the carbohydrates. The dough is then divided into suitable quantities and left for thirty to forty minutes in a warm atmosphere. It is then cooked in ovens or retorts at a temperature of three hundred to three hundred and twenty degrees Fahrenheit. Steam is injected into the cooking chamber to prevent the formation of a thick crust. After cooking from one and a half to two hours, the material is removed and cooled and prepared for flaking. This is done by passing the cooked material through a suitable machine, where it may be reduced to a semi-plastic condition and then passed through a die plate, from whence it is cut into the desired form and size. The small pieces are taken preferably on to a travelling band and passed through a current of drying air, thereby drying the surface slightly in order to prevent the material from sticking on to the flaking rollers. These partially dried pieces are then conveyed on a travelling band to the flaking rollers, where they are flattened out and dropped on to another band or carrier and delivered on to the travelling plates of a baking oven. The flakes are spread evenly on the baking pans or the travelling floor of the oven, in which the temperature should not exceed 350° F., but will be governed by the speed of the travelling floor. I prefer to toast the flakes for from three and one-half to four minutes at a temperature of from 310° to 320° Fahrenheit, at the same time using a small quantity of steam in the toasting chamber. When the toasted flakes leave the oven, they are conveyed to a cooling chamber, provided with a moisture expelling fan, in order to maintain a very low degree of humidity. When sufficiently cool, they are immediately packed in air-tight containers and finally sealed. Many changes may be made in carrying out my process without departing from the spirit of my invention. The fruit, for instance, may be used in its raw state or it may be used in the form of a dry powder or a dry flour. In the latter case, hot water is added to the fruit product to bring it to a consistency about equal to the wet apple pulp.

Twenty-five pounds of apple powder mixed with seventy-five pounds of warm water would produce one hundred pounds of pulp, which could be used in exactly the same manner as a hundred pounds of the fresh pulp.

To ensure a thorough cooking of the various ingredients, a vesicular condition of the mass must be obtained by fermentation or by other means. For instance, I may employ an acid and an alkali, which in chemical combination, along with the action of heat and moisture, produce carbonic acid gas, thereby aerating and distending the dough. Or, the various ingredients may be heated during the mixing of the mass by forcing air into the mass and then placing it in a heated vacuum oven, thus allowing expansion to take place for a short period, then breaking the vacuum until atmospheric pressure is reached, and then cooking in the usual manner.

I may use any kind of fruit in my preparation, but prefer apples, not only owing to their abundance but also to their dietetic and nutritive values. Apples, however, deteriorate by long storage and are not available in their natural state throughout the entire year. I may therefore prepare the apple product in a preserved form by first cooking the apples, then pulping and rejecting only the skins, seeds and seed cells. The pulp is then fed on to roller driers, which have their surfaces made of a material which will be unaffected by the acid in the fruit. During this drying operation, the pulp has its moisture content reduced to less than 10% and, in this condition, it may be satisfactorily stored and preserved for future use. Other drying methods may be adopted for reducing the apple pulp to a powdered condition. Again, at certain times of the year, it may not be necessary to reduce the apples to a dry condition. The pulp may be reduced to a moisture content of from 40% to 50% and, upon being mixed with the cereal, yeast and other ingredients and fermented to a definite state, cooked and flaked as above described.

The nutritive value of apples is evidenced by the following analysis:—

| | |
|---|---|
| Fibre | 3.20 |
| Wax, fat and gluten | .20 |
| Casein | .16 |
| Albumen | 1.40 |
| Dextrin | .70 |
| Sugar | 10.00 |
| Acid | .34 |
| Water | 84.00 |

This composition, after the moisture content is reduced to about 8%, becomes more concentrated, and consequently its nutritive value has been increased according to its weight and, by the addition of a cereal and a small quantity of sugar, its dietetic value is considerably enhanced. The apple furnishes mineral salts and organic acids so necessary to the human system, and also vegetable albumens which promote and assist digestion. In my invention, I retain all these natural properties and, by reducing the moisture content and combining with a cereal, I produce an almost perfectly balanced food. In contra-distinction to the majority of prepared cereal breakfast foods, I do not predigest the carbohydrates by the addition of diastase in any form, but rely on the action of the mineral salts and organic acids to perform this function. It is obvious that these natural constituents are preferable to the introduction of diastase of malt.

Having thus described my invention, what I claim is:—

1. The process of producing a breakfast food, which consists in mixing a fruit pulp with sugar, yeast and a cereal, baking same, then dividing the mass into particles of desired size, reducing the particles to flaked form, and then toasting said flakes.

2. A flaked and toasted food product consisting of fruit pulp, sugar, salt, yeast and cereal flour.

3. A flaked and toasted food product consisting of approximately 100 pounds apple pulp, 10 to 20 pounds of sugar, 10 to 16 ounces of salt, 1 pound of yeast and 100 pounds of cereal flour.

4. The process of producing an article of food consisting in mixing a fruit pulp, sugar, salt, yeast, and cereal permitting fermentation of said mass to a limited degree, cooking said mass after fermentation and then flaking.

In witness whereof I have hereunto set my hand.

GEORGE F. HUMPHREY.